United States Patent
Zhou (10) Patent No.: US 10,328,754 B2
(45) Date of Patent: Jun. 25, 2019

(54) METHODS FOR SELF-POSITIONING TIRES, AND TIRE PRESSURE MONITORING SYSTEM

(71) Applicant: AutoChips Inc., Hefei (CN)

(72) Inventor: Jian Zhou, Hefei (CN)

(73) Assignee: AutoChips Inc., Hefei (CN)

( * ) Notice: Subject to any disclaimer, the term of this patent is extended or adjusted under 35 U.S.C. 154(b) by 0 days.

(21) Appl. No.: 15/861,706

(22) Filed: Jan. 4, 2018

(65) Prior Publication Data

US 2018/0208001 A1 Jul. 26, 2018

(30) Foreign Application Priority Data

Jan. 20, 2017 (CN) .......................... 2017 1 0048818

(51) Int. Cl.
*B60C 23/04* (2006.01)
(52) U.S. Cl.
CPC ........ *B60C 23/0416* (2013.01); *B60C 23/044* (2013.01); *B60C 23/0449* (2013.01); *B60C 23/0493* (2013.01); *B60C 23/0455* (2013.01)
(58) Field of Classification Search
CPC ............ B60C 23/0449; B60C 23/0493; B60C 23/0416; B60C 23/0455; B60C 23/0489; F25D 29/00
See application file for complete search history.

(56) References Cited

U.S. PATENT DOCUMENTS

| | | | |
|---|---|---|---|
| 5,463,374 A | 10/1995 | Mendez et al. | |
| 6,725,712 B1 * | 4/2004 | King | B60C 23/0416 73/146.5 |
| 6,983,649 B2 * | 1/2006 | Katou | B60C 23/0416 340/442 |
| 2006/0042368 A1 * | 3/2006 | Hirota | B60C 23/0416 73/146 |
| 2006/0238323 A1 * | 10/2006 | Watabe | B60C 23/0416 340/442 |
| 2009/0066498 A1 * | 3/2009 | Jongsma | B60C 23/0416 340/447 |
| 2011/0254678 A1 * | 10/2011 | Sun | B60C 23/0438 340/447 |
| 2014/0340213 A1 * | 11/2014 | Okada | B60C 23/0416 340/444 |

FOREIGN PATENT DOCUMENTS

| | | |
|---|---|---|
| CN | 204870394 U | 12/2015 |
| JP | 5051422 B2 | 10/2012 |
| KR | 101349855 B1 | 1/2014 |

* cited by examiner

*Primary Examiner* — Mirza F Alam (57) ABSTRACT

A method for self-positioning tires and a tire pressure monitoring system are provided. The method for self-positioning tires includes: acquiring first position information detected by the first positioning circuit; acquiring second position information of each emitter respectively via corresponding second positioning circuit; and acquiring corresponding relative position information respectively between the receiver and each emitter based on the first position information of the receiver and the second position information of each emitter. In this way, compared with the method for achieving self-positioning function in the art, extra wires may not be needed and the origin wires of a vehicle may not be altered in the method of the present disclosure.

12 Claims, 4 Drawing Sheets

METHODS FOR SELF-POSITIONING TIRES, AND TIRE PRESSURE MONITORING SYSTEM

CROSS-REFERENCE TO RELATED APPLICATIONS

This application claims all benefits accruing under 35 U.S.C. § 119 from China Patent Application No. 201710048818.4, filed on Jan. 20, 2017 in the China Intellectual Property Office, the contents of which are hereby incorporated by reference.

TECHNICAL FIELD

The present disclosure generally relates to electronic automobile technologies, and in particular relate to a method and an apparatus for self-positioning tires and a tire pressure monitoring system.

BACKGROUND

The Tire Pressure Monitoring System (TPMS) is an active safety apparatus for automobiles monitoring pressure of tires in real time to make drivers know about the pressure data at any time and give an alarm timely when the pressure of tires is much lower or larger than the normal pressure. The TPMS has improved the safety in driving a vehicle and effectively reduced traffic accidents, which has social and economical benefits. The function of self-positioning tires in the TPMS means that the position of a tire may be altered when the automobile is in maintenance, a corresponding relationship between an emitter in the tire and the position of the tire shall be set automatically without a manual adjustment.

However, the function of self-positioning tires in the TPMS is not perfect, and achievements in the art for the self-positioning function for tires in the TPMS is listed as follow.

First, a self-positioning method based on field intensity is achieved, in which the cost is low and most functions is achieved via software algorithms. However, in the self-positioning method based on field intensity, wires of a vehicle are needed to depend on, signals are interfaced easily, and the algorithms are complicate and hard to be achieved.

Second, a self-positioning method based on an external encoding memory is achieved, in which signals is not interfaced easily and it has a high successful rate. However, in self-positioning method based on an external encoding memory, an external device is needed in the accessories for tires additionally, which results in high cost, and extra wires are needed, which will probably alter the original wires of the automobile.

Third, a self-positioning method based on a CAN bus is achieved, in which an emitter is needed to be placed near the position of a remote pressure monitoring circuit.

SUMMARY

Embodiments of the present disclosure provide a method for self-positioning tires and a tire pressure monitoring system, which has improved the self-positioning function of tires, and in which extra wires may not be needed and the origin wires of a vehicle may not be altered.

In accordance with an aspect of the present disclosure, a method for self-positioning tires implemented by a receiver in a vehicle is provided, wherein a first positioning circuit is provided in the receiver, an emitter is provided in each tire of the vehicle and a second positioning circuit is provided in each emitter respectively, the method comprises: acquiring first position information detected by the first positioning circuit; acquiring second position information of each emitter respectively via corresponding second positioning circuit; and acquiring corresponding relative position information respectively between the receiver and each emitter based on the first position information of the receiver and the second position information of each emitter.

In accordance with another aspect of the present disclosure, a method for self-positioning tires implemented by an emitter provided in a tire is provided, wherein a second positioning circuit is provided in the emitter and a first positioning circuit is provided in a receiver provided in a vehicle. The method comprises: acquiring second position information via the second positioning circuit; transmitting the second position information to the receiver; and receiving and storing relative position information between the receiver and the emitter; wherein the relative position information is acquired based on first position information detected by the first positioning circuit and the second position information.

In accordance with an aspect of the present disclosure, a tire pressure monitoring system comprising a receiver provided in a vehicle and an emitter provided in each tire respectively is provided, wherein the receiver comprises: a first positioning circuit configured for acquiring first position information; a first transceiver configured for transmitting a first control instruction respectively to each emitter to wake up each emitter, thereby acquiring second position information of each emitter via corresponding second positioning circuit; and a processing circuit configured for acquiring corresponding relative position information respectively between the receiver and each emitter based on the first position information of the receiver and the second position information of each emitter; each emitter comprises: a second positioning circuit configured for acquiring the second position information; and a second transceiver configured for transmitting the second position information to the receiver and receiving corresponding relative position information.

According to the method for self-positioning tires and a tire pressure monitoring system, the subsequent advantages may be achieved: the self-positioning function of tires has been achieved via positioning circuits. Compared with the way for achieving self-positioning function in the art, extra wires may not be needed and the origin wires of the vehicle may not be altered.

BRIEF DESCRIPTION OF THE DRAWINGS

In order to make the technical solution described in the embodiments of the present disclosure more clearly, the drawings used for the description of the embodiments will be briefly described. Apparently, the drawings described below are only for illustration but not for limitation. It should be understood that, one skilled in the art may acquire other drawings based on these drawings, without making any inventive work.

DETAILED DESCRIPTION

The technical solution of the embodiments of the present disclosure will be described more clearly and completely with reference to the accompanying drawings. Apparently, the embodiments described here only some exemplary embodiments, not all the embodiments. Based on the embodiments described in the present disclosure, one skilled in the art may acquire all other embodiments without any creative work. All these shall be covered within the protection scope of the present disclosure.

Figure 1:
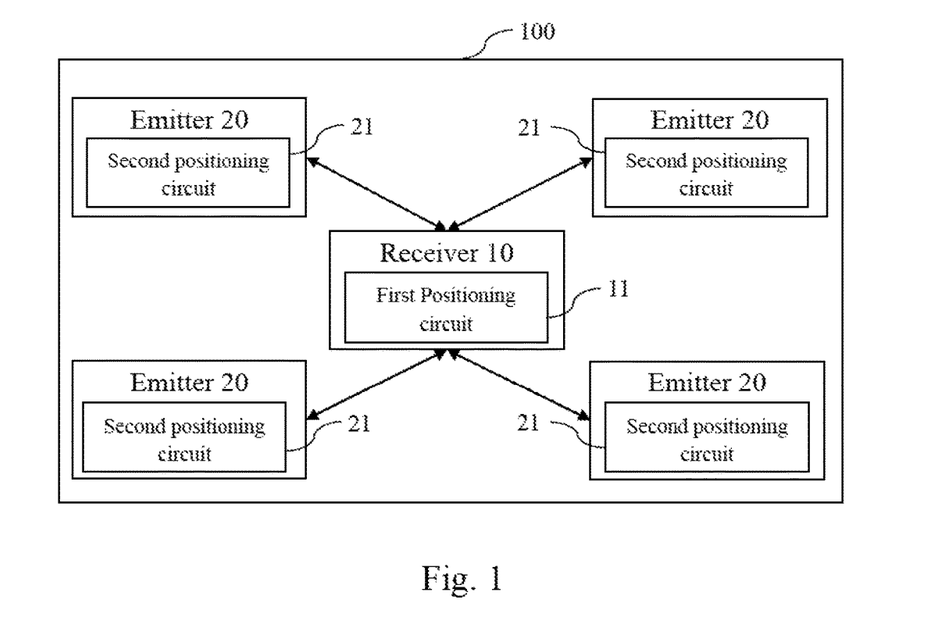
FIG. 1 is a block diagram illustrating an embodiment of a tire pressure monitoring system according to the present disclosure.

FIG. 1 is a block diagram illustrating an embodiment of a tire pressure monitoring system according to the present disclosure. As shown in FIG. 1, the tire pressure monitoring system (TMPS) 100 may include a receiver 10 and four emitters 20. The receiver 10 may be provided on a vehicle. In one embodiment, the receiver 10 may be installed in the center of the vehicle. One emitter 20 may be provided in each tire respectively. On the aspect of tire pressure monitoring, the emitter 20 may be configured to transmit corresponding pressure data to the receiver 10, and the receiver 10 may receive the corresponding pressure data to provide for drivers to know the pressure of corresponding tire in real time. However, the corresponding relationship between the emitter 20 and the tire position when the installation position of a tire is altered, at this time, there exists a mistake in the relationship between pressure data recorded by the receiver 10 and corresponding tire when the emitter 20 transmits pressure data to the receiver 10.

Aim at the above-mentioned, the receiver 10 may include a first positioning circuit 11, and each emitter 20 includes a second positioning circuit 21 respectively. The self-positioning function of each tire may be achieved via the first positioning circuit 11 and the emitters 20. The emitter 20 transmits relative position information between it and the receiver 10 to the receiver 10, meanwhile transmitting pressure data of corresponding tire to the receiver 10, such that the pressure data recorded by the receiver 10 is consistent with the corresponding tire.

What's needed to be stated, four tires as shown in FIG. 1 are only for illustration. The TPMS in the present disclosure may also apply in other vehicles, such as an electromobile with two wheels, an electromobile with three wheels or a truck, etc. In other word, the quantity of emitters 20 may be decided according to the quantity of tires of a vehicle, such as two, three, six, etc. not being limited to four. The first positioning circuit 11 and the second positioning circuit 21 may be a device of Global Position System respectively, and may also be software or a device for achieving the positioning function.

The above receiver 10, each emitter 20 and the self-positioning function achieved by the receiver 10 and each emitter 20 will be described below.

Figure 2:
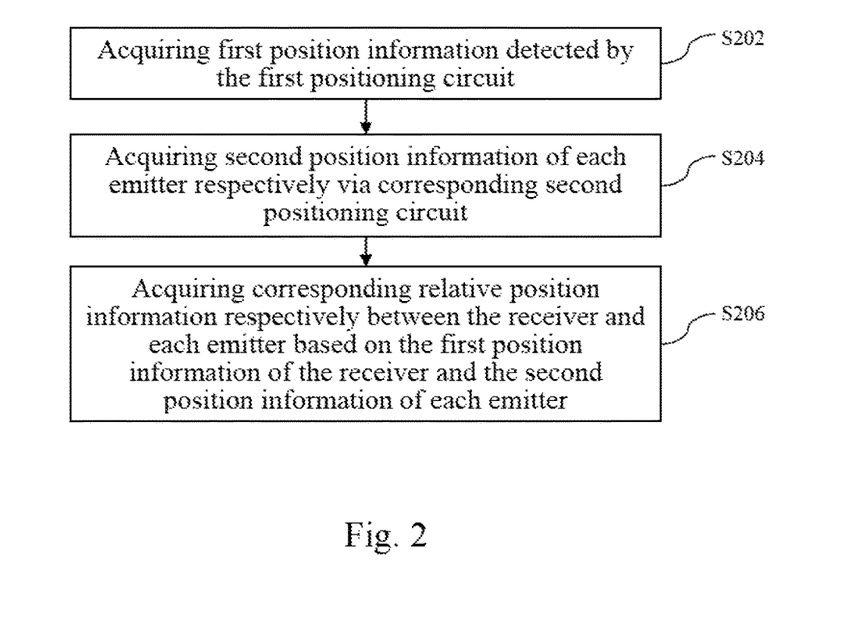
FIG. 2 is a flowchart illustrating a first embodiment of a method for self-positioning tires according to the present disclosure.

FIG. 2 is a flowchart illustrating a first embodiment of a method for self-positioning tires according to the present disclosure, and the method may be implemented by the above receiver 10 as shown in FIG. 1. In one embodiment, a first positioning circuit 11 may be provided in the receiver 10, an emitter 20 may be provided in each tire, and a second positioning circuit 21 may be provided in each emitter. As shown in FIG. 2, the method may include the following blocks.

In block S202, first position information detected by the first positioning circuit 11 may be acquired.

The first positioning circuit 11 may be configured to detect the first position information corresponding to the receiver 10. Before the first position information may be detected by the first positioning circuit 11, the receiver 10 may be set to power on, thereby the first positioning circuit 11 may be set to power on. The first positioning information may be acquired correspondingly when the first positioning information has been detected by the first positioning circuit 11 successfully, and then the following blocks may be implemented.

In block S204, respective second position information of emitters 20 may be acquired respectively via corresponding second positioning circuit 21.

Figure 3:
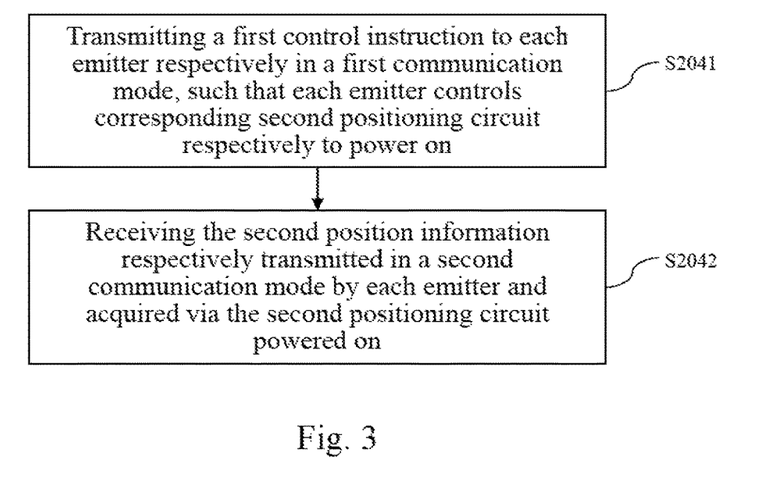
FIG. 3 is a specific flowchart illustrating the block S204 shown in FIG. 2.

The receiver 10 acquires second position information of the emitter 10 in each tire respectively via corresponding second positioning circuit 21. The second position information is corresponding to a tire. In Specific, in one embodiment, as shown in FIG. 3, the block S204 may include the following blocks.

In block S2041, a first control instruction may be transmitted to each emitter 20 in a first communication mode respectively, such that corresponding second positioning circuit 21 may be controlled by each emitter 20 to power on.

The receiver 10 transmits the first control instruction to each emitter 20 respectively, and each emitter 20 may be waked up after receiving the first control instruction. Then each emitter 20 controls corresponding second positioning circuit 21 to power on. The second positioning circuit 21 powered on may detect corresponding second position information.

In block S2042, the second position information detected via the second positioning circuit 21 powered on and transmitted in a second communication mode by each emitter may be received respectively.

The receiver 10 receives the second position information in the second communication mode, and then may compare the second position information with the first position information to acquire corresponding relative position information.

The receiver 10 transmits the first control instruction to each emitter 20 and receives second position information of each emitter in different communication modes, ensuring the amount of different transmission requirements. Further, in this embodiment, a first frequency may be adopted in the first communication mode and a second frequency may be adopted in the second communication mode. The first frequency is smaller than the second frequency. The first communication mode may be low-frequency mode of LF, for example, correspondingly the first frequency may be 125 kHz, and the second communication mode may be high-frequency mode of RF, then the second frequency may be 868 MHz or 433 MHz. What's needed to be observed, different information may be transmitted or received in different communication modes between each emitter and the receiver when self-positioning tires, such that different communication mode with different frequencies may ensure the amount of different transmission requirements.

In block S206, corresponding relative position information between the receiver and each emitter may be acquired respectively based on the first position information of the receiver and the second position information of each emitter.

The receiver 10 compares the first position information with the second position information to acquire the relative position information corresponding to each emitter 20. The relative position information may include left-front, left-back, right-front, right-back and so on.

Further, in this embodiment, the method for self-positioning tires implemented by the above receiver 10 further includes that the corresponding relative position information may be transmitted in the first communication mode to each emitter 20 respectively. The receiver 10 transmits the relative position information to each emitter 20 respectively, and each emitter 20 stores corresponding relative position after receiving the corresponding relative position. In this way, the self-positioning function for tires may be achieved.

When the first position information may not be detected via the first positioning circuit 11, in one embodiment, the method further includes that a second control instruction may be transmitted to the emitter 20 when the first position information may not be detected via the first positioning circuit 11, thereby each emitter 20 controls corresponding second positioning circuit 21 to power down. The receiver 10 transmits the second control instruction to each emitter 20, and then the emitter 20 may be waked up after receiving the second control instruction. The emitter 20 controls the second positioning circuit 21 thereof to power down such that the emitter 20 works in power-saving mode to increase the working time of the emitter 20. In one embodiment, the receiver 10 transmits the second control instruction to the emitter 20 in the first communication mode.

In this embodiment, the self-positioning function for tires has be improved via the first positioning circuit provided in the receiver and the second positioning circuit provided in each emitter. Compared with the method for achieving self-positioning function in the art, extra wires may not be needed and the origin wires of the vehicle may not be altered in the method of the present disclosure.

Figure 4:
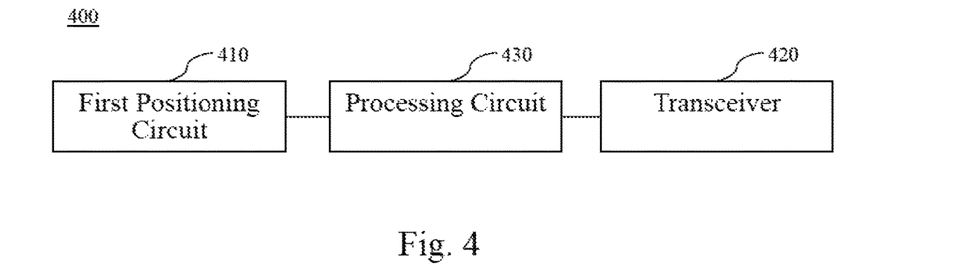
FIG. 4 is a block diagram illustrating a first embodiment of an apparatus for self-positioning tires according to the present disclosure.

FIG. 4 is a block diagram illustrating a first embodiment of an apparatus for self-positioning tires according to the present disclosure. As shown in FIG. 4, the apparatus 400 for self-positioning tires may be provided in a vehicle, used as the receiver 10 shown in FIG. 1. In one embodiment, the apparatus 400 may be provided in the center of the vehicle. The apparatus 400 may include a first positioning circuit 410, a transceiver 420 and a processing circuit 430.

The first positioning circuit 410 may be configured to detect first position information.

The transceiver 420 may be configured to transmit a first control instruction respectively to the emitter provided in each tire to wake up corresponding emitter, thereby second position information of the emitter may be detected via corresponding second positioning circuit respectively. The second positioning circuit may be provided in each emitter respectively.

The processing circuit 430 may be configured to acquire corresponding relative position information between the receiver and each emitter respectively based on the first position information of the receiver and the second position information of each emitter.

Further, in one embodiment, the transceiver 420 may acquire second position information of the emitter via corresponding second positioning circuit respectively. In specific, first, the transceiver 420 transmits a first control instruction to each emitter respectively in a first communication mode, and then each emitter controls corresponding second positioning circuit to power on respectively. Next, the transceiver 420 respectively receives second position information detected via the second positioning circuit powered on and transmitted by each emitter in a second communication mode.

In another embodiment, the transceiver 420 transmits a second control instruction to each emitter respectively when the first position information has been not detected by the first positioning circuit 410, then each emitter control corresponding second positioning circuit to power down. In this embodiment, the receiver transmit the second control instruction to each emitter in the first communication mode respectively when the first position information has been not detected by the first positioning circuit 410.

Circuits of the above-mentioned apparatus for self-positioning tires may be configured to implement blocks in the above first embodiment of the method. Detailed description will be referred to the description of the above first embodiment of the method.

Figure 5:
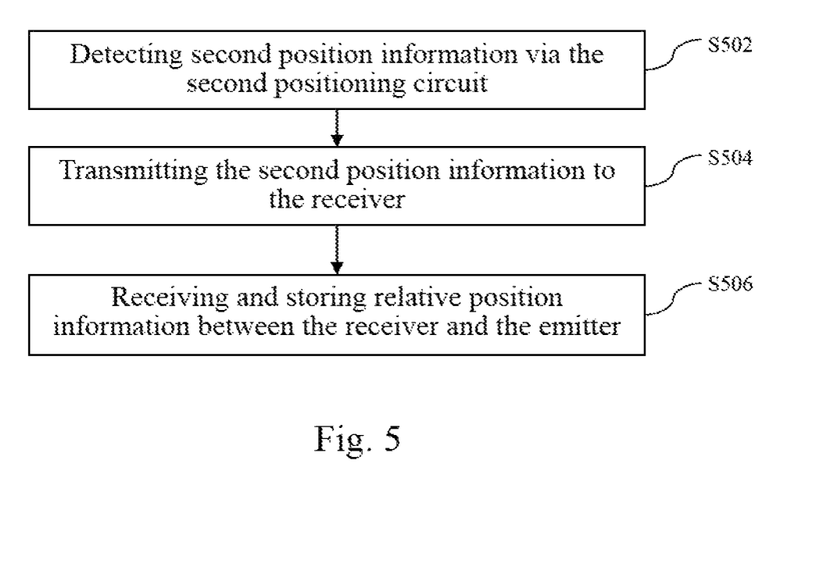
FIG. 5 is a flowchart illustrating a second embodiment of a method for self-positioning tires according to the present disclosure.

FIG. 5 is a flowchart illustrating a second embodiment of a method for self-positioning tires according to the present disclosure. The method may be implemented by the above emitter 20 shown in FIG. 1. In this embodiment, a second positioning circuit 21 may be provided in the emitter 20, and a first positioning circuit 11 may be provided in a receiver 10 provided in a vehicle. As shown in FIG. 5, the method for self-positioning tires may include the following blocks.

In block S502, second position information may be detected via the second positioning circuit 21.

The second positioning circuit 21 may be configured to detect the second position information. The second position information is corresponding to the emitter 20, in other words, a tire. Before the emitter 20 acquires the second position information, the method further includes that a control instruction from the receiver 10 may be received in a first communication mode to control the second positioning circuit 21 to power on; and the second positioning circuit 21 powered on detects the second position information. The emitter 20 may be waked up after receiving a second control instruction, and then the emitter 20 may control the second positioning circuit 21 to power on such that the second positioning circuit 21 powered on may detect the second position information.

In block S504, the second position information may be transmitted to the receiver.

The emitter 20 transmits the second position information to the receiver 10. In this embodiment, the emitter 20 transmits the second position information to the receiver 10 in a second communication mode. Further, the emitter 20 controls the second positioning circuit 21 to power down when transmitting the second position information to the receiver 10. Then the emitter 20 controls the second positioning circuit 21 to power down after the second positioning circuit 21 powered on has detected the second position information. Thus the quantity of electricity used for the emitter 20 will be saved and the working time of the emitter will be increased.

In block S506, relative position information between the receiver and the emitter may be received and stored.

The relative position information may be acquired based on first position information detected via the first positioning circuit 11 and the second position information. The relative position information may include left-front, left-back, right-front, right-back and so on. The emitter 20 receives the relative position information and stores it such that the self-positioning function for tires may be achieved. In one embodiment, the emitter 20 receives the relative position information in a first communication mode.

The emitter 20 transmits the second position information to the receiver and receives the relative position information in different communication modes, ensuring the amount of different transmission requirements. Further, in this embodiment, a first frequency may be adopted in the first communication mode and a second frequency may be adopted in the second communication mode. The first frequency is smaller than the second frequency. The first communication mode may be low-frequency mode, of LF, for example, correspondingly the first frequency may be 125 kHz, and the second communication mode may be high-frequency mode of RF, then the second frequency may be 868 MHz or 433 MHz.

When the first position information may not be detected via the first positioning circuit 11, in one embodiment, the block S504 further includes that a second control instruction from the receiver 10 may be received to control the second positioning circuit to power down when the first position information may not be detected via the first positioning circuit 11. The emitter 20 may be waked up after receiving the second control instruction, and then may control the second positioning circuit 21 to power down, such that the emitter 20 works in power-saving mode to further increase the working time of the emitter 20.

In this embodiment, the self-positioning function for tires has be improved via the first positioning circuit provided in the receiver and the second positioning circuit provided in each emitter. Compared with the method for achieving self-positioning function in the art, extra wires may not be needed and the origin wires of the vehicle may not be alter in the method of the present disclosure.

Figure 6:
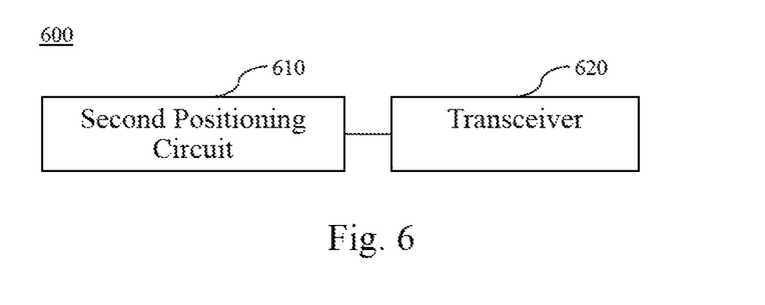
FIG. 6 is a block diagram illustrating a second embodiment of an apparatus for self-positioning tires according to the present disclosure.

FIG. 6 is a block diagram illustrating a second embodiment of an apparatus for self-positioning tires according to the present disclosure. The apparatus 600 for self-positioning tires may be provided in a tire, used as the emitter 20 shown in FIG. 1. As shown in FIG. 6, the apparatus 600 may include a second positioning circuit 610 and a transceiver 620.

The second positioning circuit 610 may be configured to detect second position information.

The transceiver 620 may be configured to transmit the second position information to a receiver provided in the center of a vehicle and receive relative position information between the receiver and the emitter from the receiver. The relative position information may be acquired based on first position information and the second position information. The first position information may be detected via the first positioning circuit.

Further the transceiver 620 transmits the second position information to the receiver in a second communication mode and receives the relative position information in a first communication mode. The transceiver 620 further receives a first control instruction from the receiver in the first communication mode to control the second positioning circuit to power on, and the second positioning circuit powered one detects the second position information. The emitter may be waked up after receiving the first control instruction, and then controls the second positioning circuit to power on such that the second positioning circuit power on may detect second position information.

When the first position information may not be detected via the first positioning circuit, in one embodiment, the transceiver 620 may be further configured to receive a second control instruction from tire receiver to control the second positioning circuit to power down when the first position information may not be detected via the first positioning circuit. The emitter may be waked up alter receiving the second control instruction, and then may control the second positioning circuit to power down, such that the emitter works in power-saving mode to further increase the working time of the emitter.

Circuits of the above-mentioned apparatus for self-positioning tires may be configured to implement blocks in the above second embodiment of the method. Detailed description will be referred to the description of the above second embodiment of the method.

Figure 7:
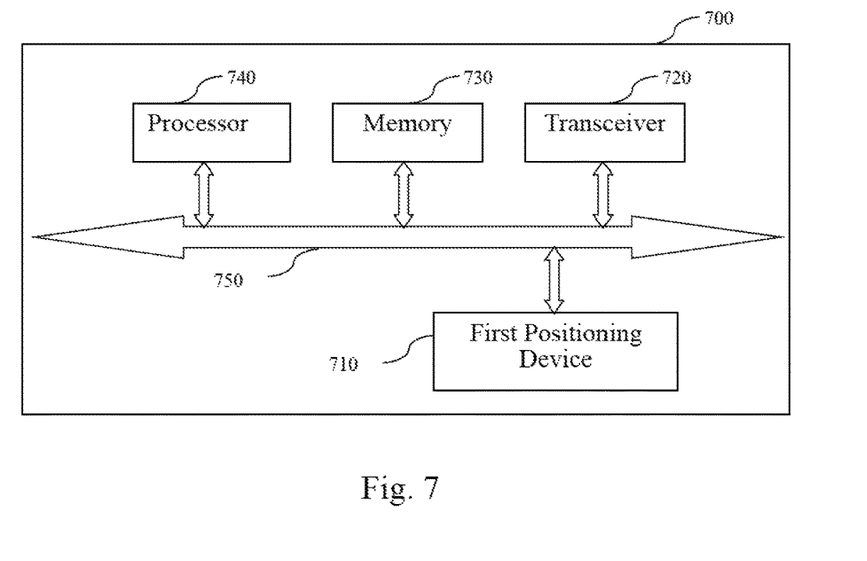
FIG. 7 is a block diagram illustrating an embodiment of a receiver according to the present disclosure.

FIG. 7 is a block diagram illustrating an embodiment of a receiver according to the present disclosure. As shown in FIG. 7, the receiver 700 may include a first positioning device 710, a transceiver 720, a memory 730, a processor 740 and a bus 750.

The first positioning device 710 may be configured to detect first position information corresponding to the receiver. The first positioning device 710 may be a device for GPS, and may also software installed in the processor for positioning or a circuit.

The memory 730 may include a read-only memory and a random access memory, and be configured to provide instructions and data for the processor 740. A part of the memory 730 may further include a non-volatile random access memory (NVKAM).

The memory 730 may store the following factors to perform circuits or data structure, of its sub-set, or its extended set.

Operation instructions, which may include kinds of operation instructions, are configured to perform kinds of operations.

Operation system, including kinds of system programs, is configured to perform kinds of basic services and process tasks based on hard.

In the embodiment of the present disclosure, the processor 740 may be configured to perform the following operations via the operation instructions stored in the operation system of the memory 730.

First position information may be acquired via the first positioning device 710.

A first control instruction may respectively be transmitted to an emitter provided in each tire to wake up the emitter, thereby second position information may respectively be transmitted via a second position apparatus provided in the corresponding emitter.

And corresponding relative position information between the receiver and each emitter may be acquired respectively based on the first position information of the receiver 700 and the second position information of each emitter.

In specific application, the above-mentioned components of the receiver 700 may be coupled together via the bus 750. Except for including a data bus, the bus 750 may further include a power bus, a control bus, a status bus, and the like. However, for apparent description, kinds of bus in FIG. 7 are marked as the bus 750. The processor may be an integrated circuit chip with an ability to process signals. During the implementation, all blocks of the above method may be performed by the integrated logical circuit in form of hardware or instructions in forms of software in the processor 740. The processor 740 may be a common processor, a Digital Signal Processor (DSP), an Application Specific Integrated Circuits (ASIC), a Field Programmable Gate Array (FPGA) or another programmable logical device, a discrete gate or transistor logic device, a discrete hardware component, which is designed to perform methods, blocks and logical diagrams disclosed herein. The blocks herein may be directly performed by a decoding processor or the combination of hardware and software circuits in a decoding processor. The software circuits may be located in a memory media, such a random memory, a flash memory, a read-only memory, programmable read-only memory or electrically erasable and programmable read only memory, a register and the like. The memory media may be located in the memory 730, the processor 740 reads the information in the memory 730, and performs the above-mentioned method together with hardware thereof.

Figure 8:
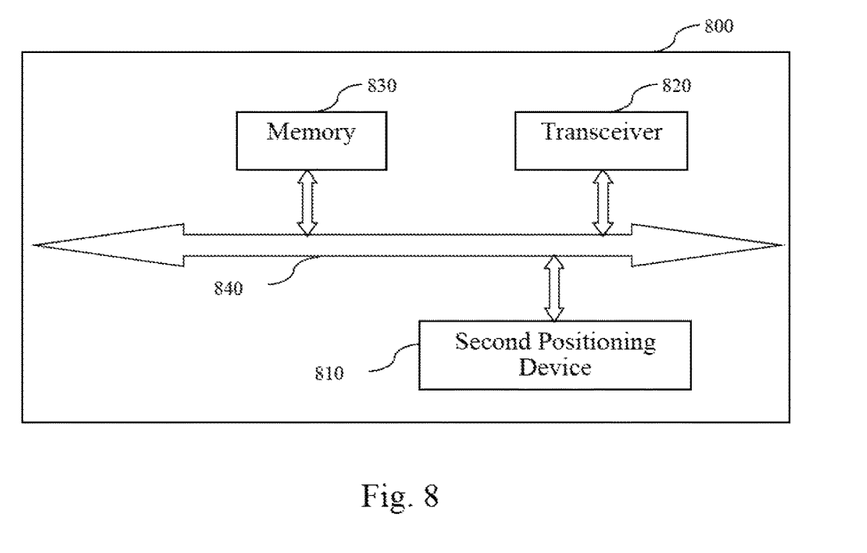
FIG. 8 is a block diagram illustrating an embodiment of an emitter according to the present disclosure.

As shown in FIG. 8, which is a block diagram illustrating an embodiment of an emitter according to the present disclosure, the emitter 800 may include a second positioning device 810, a transceiver 820, a memory 830 and a bus 840.

The second positioning device 810 may be configured to detect second position information. Each second position information is respectively corresponding to a tire in which a second positioning device 810 is provided correspondingly. The second positioning device 810 may be a GPS device.

The transceiver 820 may be configured to transmit the second position information to a receiver provided in the center of a vehicle, and receive relative position information from a receiver between the receiver and the emitter acquired based on first position information and the second position information. Wherein, the first position information may be acquired by a first positioning device provided in the receiver.

The memory 830 may be configured to store the relative position information received from the receiver, pressure data of tires, and the like.

In specific application, the above-mentioned components of the emitter 800 may be coupled together via the bus 840. Except for a data bus, the bus 840 may further include a power bus, a control bus, a status bus, and the like. However, for apparent description, kinds of bus in FIG. 8 are marked as the bus 840.

The above description depicts merely some exemplary embodiments of the disclosure, but does not mean to limit the scope of the disclosure. Any equivalent structure or flow transformations made to the disclosure, or any direct or indirect applications of the disclosure on other related fields, shall all be covered within the protection of the disclosure.

What is claimed is:

1. A method for self-positioning tires implemented by a receiver in a vehicle, wherein a first positioning circuit is provided in the receiver, an emitter is provided in each tire of the vehicle and a second positioning circuit is provided in each emitter respectively, the method comprising:
   acquiring first position information detected by the first positioning circuit;
   acquiring second position information of each emitter respectively via the corresponding second positioning circuit; and
   acquiring corresponding relative position information respectively between the receiver and each emitter based on the first position information of the receiver and the second position information of each emitter;
   wherein the step of acquiring second position information of each emitter respectively via the corresponding second positioning circuit, comprises:
   transmitting a first control instruction to each emitter respectively by the receiver in a first communication mode, so that the each emitter controls the corresponding second positioning circuit to power on according to the first control instruction; and
   receiving the second position information respectively transmitted in a second communication mode by each emitter and acquired via the powered-on second positioning circuit;
   wherein the first communication mode works in a first frequency, the second communication mode works in a second frequency, and the first frequency is lower than the second frequency.

2. The method according to claim 1, after the step of acquiring corresponding relative position information respectively between the receiver and each emitter based on the first position information of the receiver and the second position information of each emitter, the method further comprising:
   transmitting corresponding relative position information to each emitter in the first communication mode respectively by the receiver.

3. The method according to claim 1, wherein the first frequency is 125 kHz, and the second frequency is 868 MHz.

4. The method according to claim 1, wherein the first frequency is 125 kHz, and the second frequency is 433 MHz.

5. The method according to claim 1, further comprising:
   transmitting a second control instruction to each emitter respectively when the first position information is not acquired by the first positioning circuit, such that each emitter controls corresponding second positioning circuit to power down respectively.

6. The method according to claim 1, wherein before the acquiring first position information detected by the first positioning circuit, the method comprises:
   powering on the first positioning circuit when the receiver is powered on.

7. A method for self-positioning tires implemented by an emitter provided in a tire, wherein a second positioning circuit is provided in the emitter and a first positioning circuit is provided in a receiver provided in a vehicle, comprising:
   acquiring second position information via the second positioning circuit;
   transmitting the second position information to the receiver, wherein the receiver is configured to receive the second position information and acquire first position information detected by the first positioning circuit in the receiver, and then acquire relation position information between the receiver and the emitter; and
   receiving and storing the relative position information by the emitter from the receiver;
   wherein the step of acquiring second position information via the second positioning circuit, comprises:
   receiving a first control instruction from the receiver in a first communication mode, thereby controlling the second positioning circuit to power on according to the first control instruction; and
   detecting the second position information via the powered-on second positioning circuit;
   transmitting the second position information to the receiver in a second communication mode;
   wherein the first communication mode works in a first frequency, the second communication mode works in a second frequency, and the first frequency is lower than the second frequency.

8. The method according to claim 7, wherein the emitter receives the relative position information in the first communication mode.

9. The method according to claim 7, wherein the first frequency is 125 kHz, and the second frequency is 868 MHz.

10. The method according to claim 7, wherein the first frequency is 125 kHz, and the second frequency is 433 MHz.

11. The method according to claim 7, wherein the transmitting the second position information to the receiver further comprises:
receiving a second control instruction from the receiver when the first position information has been not acquired via the first positioning circuit, thereby controlling the second positioning circuit to power down.

12. A tire pressure monitoring system comprising a receiver provided in a vehicle and an emitter provided in each tire respectively, wherein the receiver comprises:
a first positioning circuit configured to acquire first position information;
a first transceiver configured to transmit a first control instruction respectively to each emitter to wake up each emitter, thereby acquiring second position information of each emitter via corresponding second positioning circuit; and
a processing circuit configured to acquire corresponding relative position information respectively between the receiver and each emitter based on the first position information of the receiver and the second position information of each emitter;
each emitter comprises:
a second positioning circuit configured to acquire the second position information; and
a second transceiver configured to transmit the second position information to the receiver and receive corresponding relative position information;
wherein the second transceiver of each emitter is further configured to receiving a first control instruction from the receiver in a first communication mode, thereby controlling the second positioning circuit to power on according to the first control instruction, such that the powered-on second positioning circuit detects the second position information and transmits the second position information to the receiver in a second communication mode; and
the first communication mode works in a first frequency, the second communication mode works in a second frequency, and the first frequency is lower than the second frequency.

* * * * *